United States Patent
Carey et al.

(10) Patent No.: US 10,297,233 B2
(45) Date of Patent: *May 21, 2019

(54) MODIFYING A PRESENTATION OF CONTENT BASED ON THE EYEWEAR OF A USER

(71) Applicant: International Business Machines Corporation, Armonk, NY (US)

(72) Inventors: James E. Carey, Rochester, MN (US); Jim C. Chen, Rochester, MN (US); Rafal P. Konik, Oronoco, MN (US); Ryan L. Rossiter, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/444,400

(22) Filed: Feb. 28, 2017

(65) Prior Publication Data

US 2018/0247610 A1 Aug. 30, 2018

(51) Int. Cl.
*G09G 5/30* (2006.01)
*G06K 9/00* (2006.01)

(52) U.S. Cl.
CPC ........... *G09G 5/30* (2013.01); *G06K 9/00228* (2013.01); *G06K 9/00255* (2013.01); *G09G 2320/08* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| 8,411,907 | B2 | 4/2013 | Nelson et al. | |
|---|---|---|---|---|
| 2008/0055228 | A1 | 3/2008 | Glen | |
| 2011/0305375 | A1* | 12/2011 | Nelson | G06F 3/005 382/118 |

(Continued)

FOREIGN PATENT DOCUMENTS

WO 2013131418 A1 9/2013

OTHER PUBLICATIONS

Gaudin, S., "Vision-correcting display nixes your need for eyeglasses", Computerworld, Jul. 31, 2014 7:43 AM PT, 5 pages, <http://www.computerworld.com/article/2490626/emerging-technology/vision-correcting-display-nixes-your-need-for-eyeglasses.html>.

(Continued)

*Primary Examiner* — Nurun N Flora
(74) *Attorney, Agent, or Firm* — Daniel R. Simek

(57) ABSTRACT

A method for modifying a presentation of content. The method includes a computer processor determining whether a user of a computing device wears eyewear based, at least in part, on analyzing an image of the face of the user. The method further includes responding to determining that the user wears eyewear, by determining a set of characteristics of the eyewear of the user. The method further includes determining a set of environmental factors in proximity of the user and the computing device. The method further includes modifying a presentation of visual content on the computing device based, on the set of characteristics of the eyewear of the user and the determined set of environmental factors in proximity of the user and the computing device.

20 Claims, 4 Drawing Sheets

(56) References Cited

U.S. PATENT DOCUMENTS

| | | |
|---|---|---|
| 2013/0235058 A1 | 9/2013 | Jaramillo et al. |
| 2014/0092142 A1 | 4/2014 | Boelter et al. |
| 2014/0137054 A1* | 5/2014 | Gandhi .................. G06F 3/013 715/865 |
| 2014/0240338 A1* | 8/2014 | Patino ...................... G09G 3/20 345/589 |
| 2014/0282285 A1 | 9/2014 | Sadhvani et al. |
| 2016/0375833 A1 | 12/2016 | Larson et al. |

OTHER PUBLICATIONS

Wu, et al., "Glasses Detection by Boosting Simple Wavelet Features", Proceedings of the 17th International Conference on Pattern Recognition (ICPR'04), 2004, IEEE, 4 pages.

List of IBM Patents or Patent Applications Treated as Related, Appendix P, Filed Herewith, 2 pages.

Carey, et al., "Modifying a Presentation of Content Based on the Eyeware of a User", U.S. Appl. No. 15/794,118, filed Oct. 26, 2017.

* cited by examiner

MODIFYING A PRESENTATION OF CONTENT BASED ON THE EYEWEAR OF A USER

BACKGROUND OF THE INVENTION

The present invention relates generally to the field of mobile devices, and more particularly, to modifying presentations of content by a mobile device, based on the eyewear of a user.

Developments in cellular and computing technology have resulted in the proliferation of mobile electronic/computing devices, such as smartphones, tablet computers, and wearable devices with advanced capabilities, such as digital eyeglasses (e.g., smart glasses) and smart watches. Some mobile devices are utilized for communications and can present and process work-related content to users. Other mobile devices are utilized by users for personal items, such as obtaining news and sports information, participating social networking websites where users share information, opinions, images, etc., and/or various entertainment functions (e.g., video games and movies). Various mobile devices are utilized for a variety of activities by users. However, mobile devices come in a plurality of sizes and similarly include displays of varying sizes.

Mobile devices are utilized by users in a variety of settings (e.g., indoor and outdoor) and exposed to various environmental conditions that affect the eyewear worn by a user. For example, a user may utilize a laptop computer indoors without wearing eyewear; whereas the same user may wear prescription sunglasses while utilizing a smartphone outdoors on a sunny day.

In addition, with advancements in electronics and miniaturization, mobile devices can include one or more cameras, one or more accelerometers, a global positioning system (GPS), a thermometer, an altimeter, a barometer, a compass, a chronograph, and/or near field communication (NFC) and radio-frequency identification (RFID) capabilities.

SUMMARY

According to aspects of the present invention, there is a method, computer program product, and/or system for modifying a presentation of content. In an embodiment, the method includes one or more computer processors determining whether a user of a computing device wears eyewear based, at least in part, on analyzing an image of the face of the user. The method further includes responding to determining that the user wears eyewear, by determining a set of characteristics of the eyewear of the user. The method further includes determining a set of environmental factors in proximity of the user and the computing device. The method further includes modifying a presentation of visual content on the computing device based, on the set of characteristics of the eyewear of the user and the determined set of environmental factors in proximity of the user and the computing device.

DETAILED DESCRIPTION

Figure 1:
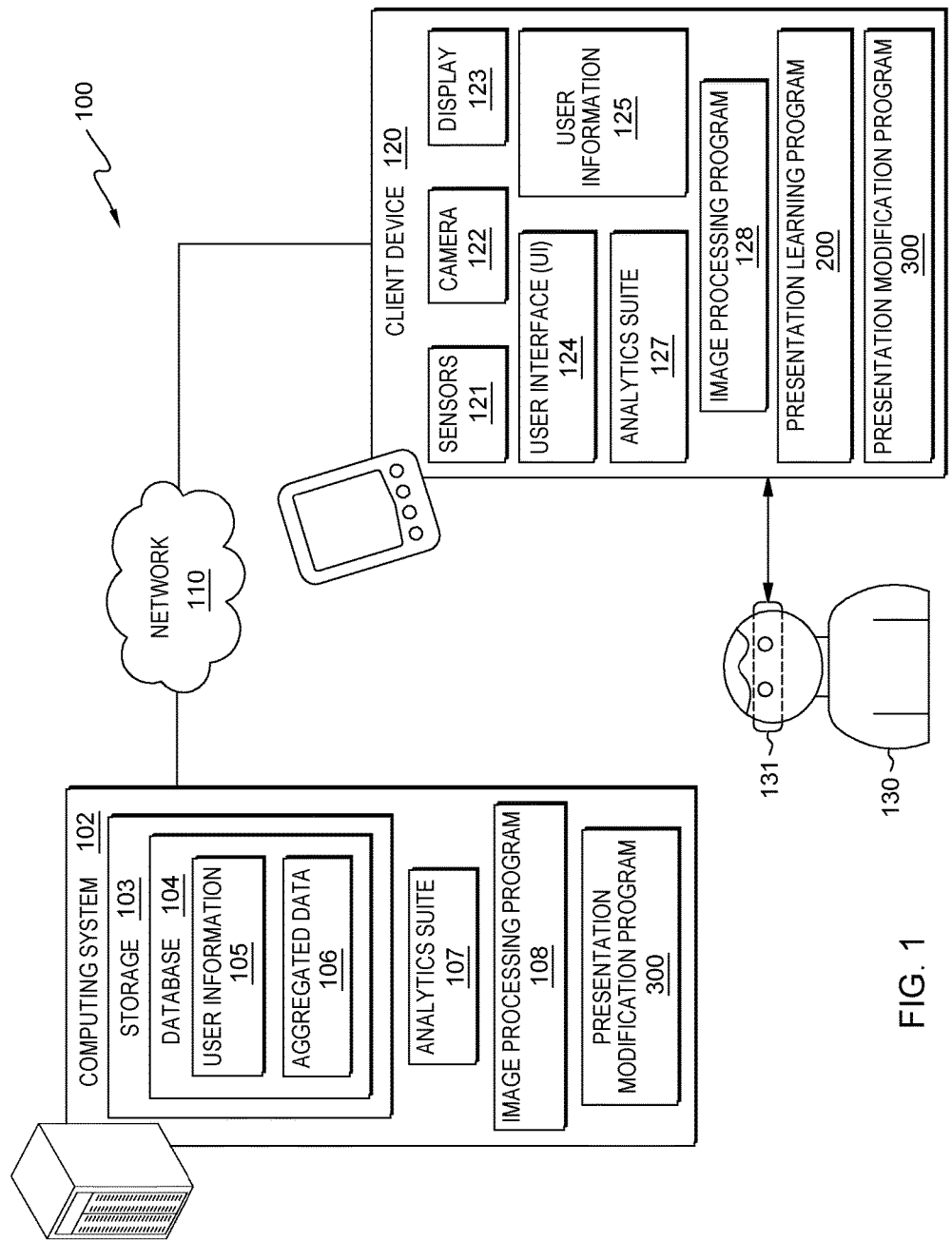
FIG. 1 illustrates a networked computing environment, in accordance with an embodiment of the present invention.

Embodiments of the present invention recognize that the presentation of visual content to a user is affected by the size of the display utilized for the presentation of the visual content, the eyewear of a user, and the environment in which the mobile device operates. In addition, the proximity (e.g., distance) of the user to the display of the mobile device also affects the presentation of visual content, herein referred to as content, to the user. Embodiments of the present invention recognize that a user of a mobile device can manually adjust various settings of the mobile device to improve the display and/or legibility of content and improve the experience of the user associated with the presented content, such as by modifying a size of a font utilized to present text and/or the brightness of the display of the mobile device. Embodiments of the present invent recognize that automating the adjustments for a presentation of content reduces user interactions and distractions and improves the experience of the user viewing content displayed by a mobile device.

Embodiments of the present invention learn the behaviors and/or preferences of a user with respect to the presentation of various types of content, such as text-based content as opposed to graphics and video-based content. Embodiments of the present invention monitor the settings utilized to display various types of content presented to a user of a mobile device and scan the face of a user to determine whether eyewear is worn; and if eyewear is worn, determine information associated with the eyewear (e.g., corrective glasses, sunglasses, contact lenses, etc.). In addition, embodiments of the present invention determine a set of environmental and/or usage factors present during the presentation of content to the user by the mobile device.

Embodiments of the present invention automatically modify the presentation of content to the user utilizing learned behaviors and/or preferences of a user and based on: monitoring characteristics of the user, such as the face of the user; determining a set of environmental factors external to the mobile device; and/or usage information (e.g., conditions settings, factors, etc.) present during a subsequent presentation of content to the user by the mobile device, such as a distance between the user and the mobile device. Some embodiments of the present invention modify a presentation of content based on a "snapshot of time" or a short duration of time, such as 5 to 20 seconds for sampling characteristics of a user and environmental factors prior to, or at the beginning of a presentation of content. Other embodiments of the present invention dynamically modify a presentation of content based on a continued sampling of characteristics of a user and environmental factors during a presentation of content. Embodiments of the present invention can utilize various analytic methods to remove transient effects and more gradually modify a presentation of content to reduce distractions to a user. Embodiments of the present invention also allow a user to override one or more adjustments to a presentation of content. Alternatively, embodiments of the present invention can present examples of modified content to a user for selection by the user, as opposed to the user manually experimenting with setting for a presentation of content.

Some embodiments of the present invention query a user of a mobile device to obtain information related to the eyewear of the user in response to detecting a type of eyewear that is not currently associated with the user. For example, for a user that wears eyewear with corrective lenses, an embodiment of the present invention may query a user in response to a user wearing sunglasses to determine whether the sunglasses include the prescription (e.g., corrective lenses) of the user.

Embodiments of the present invention can operate in a stand-alone mode within a mobile device or can operate in a client-server mode networked between the mobile device and another computing device, such as a cloud-based service accessible via the Internet. In one example, a mobile device may lack the software or computing power to analyze a presentation of content and modify the presentation based on the eyewear of the user and set of environmental factors in proximity to the user and mobile device. In another example, an embodiment of the present invention may utilize the settings for the presentation of content associated with a first mobile device of the user to modify or at least act as a basis for presentation settings for a second mobile device of the user.

Further embodiments of the present invention can anonymize and aggregate information associated with a plurality of users, mobile devices, environmental factors, and presentations of content that are stored (e.g., hosted) on a server to provide modifications of presentation of content as a service (aaS) to users. For example, an embodiment of the present invention may be installed as a service application (app) within a mobile device that can identify settings for a similar presentation of content from other users that have similar mobile devices and characteristics (e.g., eyewear) of the user and modify a presentation of content based on the identified settings without compiling behaviors of the user and usages of the mobile device.

Further, one skilled in the art would recognize that by automating modifications of content based on learned behaviors of a user, responsiveness of a mobile device is also improved. In addition, user distraction and setup time is further improved by including access to a plurality of anonymized information associated with presentations of content. As such, the functioning of such a computing device (e.g., a mobile device) is seen to be improved in at least these aspects.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked computing environment 100 in an embodiment, in accordance with the present invention. An embodiment of networked computing environment 100 may include: computing system 102, client device 120, and user 130. Computing system 102 and client device 120 are interconnected over network 110. Many modifications to the depicted environment may be made by those skilled in the art without departing from the scope of the invention as recited by the claims.

Computing system 102 and client device 120 may be laptop computers, tablet computers, netbook computers, personal computers (PC), desktop computers, personal digital assistants (PDA), smartphones, wearable devices (e.g., digital eyeglasses, smart glasses, a smart watch), or any programmable computer systems known in the art. In some embodiments, client device 120 is representative of other computing devices that include display technologies embedded within equipment and devices, such as smart televisions (TVs) and consoles (e.g., dashboards, instrumentation panels) of various types of vehicles. In certain embodiments, computing system 102 and client device 120 represent computer systems utilizing clustered computers and components (e.g., database server computers, application server computers, etc.) that act as a single pool of seamless resources when accessed through network 110, as is common in data centers and with cloud-computing applications. In general, computing system 102 and client device 120 are representative of any programmable electronic device or combination of programmable electronic devices capable of executing machine-readable program instructions and communicating with users of computing system 102 and client device 120 via network 110. Computing system 102 and client device 120 may include components, as depicted and described in further detail with respect to FIG. 4, in accordance with embodiments of the present invention.

Computing system 102 includes: storage 103, analytics suite 107, image processing program 108, and presentation modification program 300. Computing system 102 may also include an instance of presentation learning program 200. Computing system 102 also includes various programs and databases, such as an operating system, a website interface, color management software, typography software, communication protocols, etc. (not shown) within storage 103. In various embodiments, computing system 102 can access one or more programs, functions, and/or software services from another computing system (not shown) via network 110. In an example, computing system 102 accesses, via network 110, a cloud service provider that provides one or more communication services, such facial recognition software and cognitive programs as a Software as a Service (SaaS) offering.

Storage 103 includes database 104, various font libraries, and other software and data (not shown) utilized by computing system 102 and one or more embodiments of the present invention. Database 104 includes user information 105 and aggregated data 106. Database 104 may also include images (e.g., examples) of various types of eyewear and information related to each type of eyewear. Aspects of analytics suite 107 (and/or of analytics suite 127 of client device 120) can utilize the images of eyewear and corresponding information to improve one or more analyses.

User information 105 includes a plurality of information uploaded from user information 125 corresponding to one or more instances of client device 120 associated with user 130. The plurality of information (e.g., historical data) within user information 105 includes, but is not limited to: sets of characteristics, such as settings, parameters, and attributes associated with various presentations of content to user 130; information related to sets of environmental factors (e.g., environmental information) present during a presentation of content; usage information related to client device 120 during a presentation of content; and information related to characteristics related to a user 130, such as a lack of eyewear, or the presence and type of eyewear worn by user 130 during a presentation of content. Some characteristics of presented content may include a resolution, such as VGA, WXGA, or HD; and a frame rate, such as 24p (i.e., 24 frames per second progressive scan), 50i (i.e., 50 frames per second interlaced), 70p. User information 105 may also include one or more images of user 130 or at least ocular area 131 associated with a user wearing or devoid of eyewear. Other information that may be included in user information 105 is discussed with respect to user information 125 of client device 120.

Aggregated data 106 includes anonymized and aggregate information associated with a plurality of users, mobile devices, sets of environmental factors, and sets of characteristics related to presentations of content. In addition, aggregated data 106 may also include the output of one or more analyses performed by analytics suite 107 and various examples of modified presentation that can be previewed by a user. In one example, aggregated data 106 may include an array comprised of images that illustrate font variants along one axis and contrast variants along the other axis of the array. Font variants may include different font style, font weights (e.g., stroke widths), font kerning (i.e., spacing between font characters), font types, font sizes, etc. Contrast variants may include, color parings, varying brightness settings, etc. In another example, aggregated data 106 may also include decision trees and algorithms related to various presentations of content by various mobile devices. Aggregated data 106 may also include one or more tables, associative arrays, decision trees, and/or algorithms for modifying a presentation of content based on anonymized data from a plurality of users.

Analytics suite 107 includes, but is not limited to: analytic functions, cognitive functions (e.g., image recognition, natural language processing, etc.), inferential reasoning programs, statistical analysis programs, a contextual analysis program, a database query generator, etc. In one embodiment, analytics suite 107 includes: various functions, techniques and algorithms to: analyze data; determine relationships among factors; and generate one or more tables, associative arrays, decision trees, and/or algorithms for modifying a presentation of content; and/or update one or more tables, associative arrays, decision trees and/or algorithms that modify a presentation of content. In some embodiments, analytics suite 107 includes: support vector machines, artificial neural networks, naïve Bayes classifiers, machine learning functions, etc. In another embodiment, various aspects of analytics suite 107 augments various functions of analytics suite 127 of client device 120. In an example, computing system 102 may utilize analytics suite 107 to determine relationships and interactions among environmental factors affecting client device 120, settings for monitored presentations of content by client device 120, and eyewear worn by user 130.

In various embodiments, analytics suite 107 generates one or more tables, associative arrays, decision trees and/or algorithms for client device 120 based on information within user information 105. In a further embodiment, analytics suite 107 determines a set of settings for a presentation of content by client device 120 based on utilizing information of a plurality of users within aggregated data 106 to identify and/or filter users, and content associated with a similar profile and usage as user 130. In an example, the profile of users and presentations of content of aggregated data 106, analyzed by analytics suite 107 include one or more of: information related to eyewear similar to eyewear of user 130, a similar set of environmental factors in proximity to client device 120, a similar type of content (e.g., a 720p video), other instance of the same content (e.g., the same movie), etc.

Image processing program 108 is a program or suite of programs to process images uploaded from one or more instances of camera 122 of client device 120. In one embodiment, image processing program 108 determines whether user 130 wears eyewear (e.g., glasses, sunglasses, contact lenses). In some embodiments, image processing program 108 can determine information related to eyewear worn by user 130, such as, the tint and transmittance of eyewear. In another embodiment, image processing program 108 includes facial recognition capabilities that enable client device 120 to further determine the identity of user 130 to ensure that the correct presentation settings are utilized for each user that utilizes client device 120. In some embodiments, image processing program 108 can determine the position (e.g., distance, angle, orientation) of client device 120 relative to user 130. In a further embodiment, image processing program 108 analyzes and interprets items and features within the environment around user 130, such as background colors and images or sources of glare.

In one embodiment, computing system 102 and client device 120 communicate through network 110. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between computing system 102 and client device 120, in accordance with embodiments of the present invention. In another embodiment, network 110 operates locally via wired, wireless, or optical connections and can be any combination of connections and protocols (e.g., personal area network (PAN), near field communication (NFC), laser, infrared, etc.). In a further embodiment, network 110 is utilized to communicate a presentation of content to one or more different instances of display 123 (not shown) that are external to client device 120, such via screen mirroring or multi-screen mode.

Client device 120 includes hardware, such as sensors 121, one or more instances of camera 122, and display 123. Client device 120 may also include hardware associated with a global positioning system (GPS), near field communication (NFC), and radio-frequency identification (RFID) (not shown). Client device 120 includes software and data, such as user interface (UI) 124, user information 125, analytics suite 127, image processing program 128, presentation learning program 200, and presentation modification program 300. Client device 120 may also include various programs and data, such as a website interface, an office productivity suite, one or more presentation apps/programs, color management software, typography software, various font libraries, etc. (not shown). In various embodiments, client device 120 can access one or more programs, functions, and/or software services from another computing system (not shown) via network 110. In one example, computing system 102 accesses, via network 110, a streaming video service (not shown) or a cloud service provider (not shown) that provides one or more communication services, and other software applications, such as a digital signal processing program, or a speech translation program as a Software as a Service (SaaS) offering.

In a further embodiment, client device 120 is representative of two or more computing devices that communicate via a network, such as a PAN or NFC. In one example, content is presented by an instance of display 123 included in a pair of smart glasses, where the smart glasses obtain content via another mobile device, such as a smartphone or tablet computer. In another example, client device 120 may be linked to another display technology that can fit over the head and ocular area (e.g., with or sans glasses/contacts) of user 130, such as a virtual reality headset, or a smart glasses add-on that attaches to a pair of glasses of user 130.

Sensors 121 may include one or more of: an accelerometer, a thermometer, a hygrometer, an altimeter, a barometer, a compass, a gyroscope, a position/orientation device, an illumination sensor, a rangefinder (e.g., a laser, an infrared (IR) and/or ultrasonic distance sensor), etc.

Camera 122 is representative of one or more digital cameras of client device 120. Camera 122 may include additional hardware and electronic elements that affect magnification, optical sensitivity, focus, field of view, and image stabilization.

In various embodiments, a user of client device 120 can interact with UI 124 via a singular device, such as a touch screen (e.g., display) that performs both input to a GUI/WUI, and as an output device, via display 123, presenting a plurality of icons associated with apps and/or images depicting one or more executing applications. In other embodiments, an application (e.g., a web browser) can generate UI 124 operating within the GUI environment of client device 120.

UI 124 can accept input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, a peripheral, such as a cyberglove, may provide haptic feedback to a user, and may be included in client device. An I/O device interfacing with UI 124 may be respectively connected to computing system 102, and client device 120 may operate utilizing wired (e.g., USB port) or wireless (e.g., infrared, NFC, etc.) network communications. Examples of I/O devices that may be peripherals are: a keyboard, a mouse, a trackball, and a click wheel that provides input from a user. In an example, a user of client device 120 may utilize UI 124 to interact with functions and applications (not shown) installed on client device 120 and/or accessible via network 110, presentation learning program 200, and/or presentation modification program 300. In various embodiments, UI 124 may receive input in response to a user of client device 120 utilizing natural language, such as written words or spoken words, that client device 120 identifies as information and/or commands.

User information 125 includes a plurality of information (e.g., historical data) associated with characteristics associated with various presentations of content to user 130, information related to a set of environmental factors present during a presentation of content, usage information related to client device 120, and information related to the presence and type of eyewear worn by user 130 during a presentation of content. User information 125 may also include one or more images of user 130 or ocular area 131 associated with user 130 wearing or devoid of eyewear. User 130 may update elements of user information 125 with information that may not be able to be directly determined by client device 120. In an example, user 130 may indicate that a pair of sunglasses within one image of user 130 is a pair of prescription sunglasses. In another example, user 130 may identify for the purposes of comparison an image with contact lenses and an image without contact lenses.

In some embodiments, user information 125 includes a table, an associative array, a decision tree, and/or a database that links and/or interrelates: environmental factors, setting for a presentation of content, user preferences, presence or lack eyewear of a user, and information related to the eyewear of a user. In one embodiment, user information 125 may include information, tables, associative arrays, decision trees, and/or databases received from other client devices of a user (not shown) and/or computing system 102. In another embodiment, if client device 120 is shared among users, then client device 120 may include a different instance of user information 125 corresponding to each user.

User preferences include but are not limited to trigger durations for decisions, rates and/or durations of sampling for obtaining information, one or more statistical analyses for samples of information and data, a list of programs or content type associated with one or more embodiments of the present invention. In one example, user preferences may indicate whether sampling for obtaining information is semi-continuous to continuous for dynamic modifications of presentation. In another example, user information 125 may include a user preference of a running average for one or more samples of data or information to buffer a response to a transient event to avoid abrupt modifications to a presentation of content. In a further embodiment, some or all of the information within user information 125 is anonymized, filtered, and uploaded to aggregated data 106 of computing system 102.

Analytics suite 127 includes one or more programs and functions previously discussed with respect to analytics suite 107 of computing system 102. In one embodiment, one or more aspects of analytics suite 127 analyzes samples of data and information, and determines patterns and/or statistical values for samples of data and information. In one example, analytics suite 127 determines an average value for an ambient light level and that the ambient light level varies over time or during a presentation of content within a range of light levels.

In another embodiment, analytics suite 127 includes: various functions, techniques and algorithms to: analyze data, determine relationships among factors, generate a decision tree and/or an algorithm for modifying a presentation of content, and/or update one or more decision trees and/or algorithms that modify a presentation of content. Analytics suite 127 may analyze data and information within user information 125, from sensors 121, one or more instance of camera 123, and/or image processing program 128. In some embodiment, analytics suite 127 determines relationships among various factors and generates one or more tables, associative arrays, decision trees, and/or algorithms based on learned behaviors of user 130 with respect to presentations of content and sets of environmental information in proximity and/or present during presentations of content. In various embodiments, analytics suite 127 processes changes to a set of environmental factors affecting client device 120 in near real time that affect the presentation of content by client device 120, such as compensating for the change in transmittance of photochromic lenses (e.g., a photochromic coating) within the eyewear of a user in response to illumination changes or responding to varying illumination conditions that occur while user 130 travels.

Image processing program 128 is a program or suite of programs to process images input from one or more instances of camera 122. In one embodiment, image processing program 128 determines whether user 130 wears eyewear (e.g., glasses). In some embodiments, image processing program 128 can determine information (e.g., tint and transmittance) related to eyewear worn by user 130. In another embodiment, image processing program 128 includes facial recognition capabilities that enable client device 120 to further determine the identity of user 130 to ensure that the correct presentation characteristics (e.g., parameters and settings) are utilized for each user that utilizes client device 120. In various embodiments, image processing program 128 include capabilities previous discussed with respect to image processing program 108.

Presentation learning program 200 is a program to learn the behaviors of a user and the presentation preferences of a user based on at least determining the eyewear or lack thereof worn by a user during a presentation of content to the user and a set of characteristics utilized by an app or program that presents content to a user of a mobile device. Presentation learning program 200 can also monitor and/or determine various environmental factors present during a presentation of content by a client device to the user. Presentation learning program 200 stores such information as historical data for analysis. The output of the analyses is subsequently utilized by an instance of presentation modification program 300 to dynamically modify another presentation of content. In one embodiment, presentation learning program 200 activates in response to a presentation of content by an app or program (not shown) of client device 120, such as a web browser plugin or media player. In an example, presentation learning program 200 activates based on one or more user preferences, such as an identified presentation program or type of visual content. In another embodiment, presentation learning program 200 executes in response to client device 120 activating. In some embodiments, presentation learning program 200 activates in response to one or more commands input to UI 124. In an example, to save battery life within client device 120 and/or minimize resource usage, user 130 manually activates presentation learning program 200.

In various embodiments, presentation learning program 200 utilizes on-device and/or server-based statistical, analytical, and cognitive functions to determine relationships among the presence of eyewear if worn and information related to the eyewear worn by a user during a presentation of content to the user, the characteristics (e.g., content type, content characteristics, settings, etc.) of presentation, and a set of environmental factors present during the presentation of content by the client device. In a further embodiment, presentation learning program 200 uploads the information associated with a presentation of content, a set of environmental information (e.g., environmental factors), the client device, and presence of eyewear if worn and information related to the eyewear of a user (e.g., historical data) to a server that provides one or more as-a-Service functions to one or more users. In one example, presentation learning program 200 anonymizes the information to upload that is associated with presentation of contents, various client devices, and the presence of eyewear if worn and information related to the eyewear worn by users within aggregated data 106 of computing system 102. An instance of presentation learning program 200 can analyze aggregated data 106 to generate: tables, associative arrays, decision trees and/or algorithms that modify presentations and provide suggestions for modifying the presentation of content based on one or more factors and/or presentations of content not currently associated with a user.

Presentation modification program 300 is a program for modifying the presentation of content to a user of a client device based on a current set of factors associated with the client device, the content being presented by the client device, and eyewear of the user. In one embodiment, presentation modification program 300 executes within client device 120 and utilizes the output of various analyses of historical data to obtain one or more tables, associative arrays, decision trees, and/or algorithms to modifying a presentation of content (e.g., modifying presentation settings and parameters) based on the content that is presented and one or more factors associated with the user of the client device and/or environmental factors in proximity of the client device. In another embodiment, presentation modification program 300 executes on another computing device, such as computing system 102 and utilizes the output of various analyses of historical data to obtain one or more tables, associative arrays, decision trees, and/or algorithms to modifying a presentation of content (e.g., modifying presentation characteristics) based on the content that is presented and one or more factors associated with the user of the client device and/or environmental factors in proximity of the client device. In various embodiments, a user of the client device can override one or more modifications to a presentation of content applied by presentation modification program 300.

In some embodiments, an instance of presentation modification program 300 can execute concurrently with an instance of presentation learning program 200 within the same computing device. In a further embodiment, two or more instances of presentation modification program 300 may execute concurrently to dynamically modify a shared presentation of content among two or more user 130's viewing the presentation of content via different instances of display 123 and corresponding instances of camera 122. In an example, one instance of client device 120, operates within a vehicle and presents a movie to two passengers (e.g., two instances of user 130) in the backseats of the vehicle. The rear of each front seat of the vehicle includes a corresponding instance of camera 122 and display 123. Client device 120 can execute two instances of presentation modification program 300 to dynamically modify the presentation of content to each passenger as various environments factors change, such as varying levels of illumination entering the vehicle, and/or a passenger viewing the presentation changes eyewear (e.g., a passenger removes sunglasses in response to lower levels of light entering the vehicle).

User 130 is representative of a user that utilizes client device 120 to view the presentation of content by client device 120. In one embodiment, various portions of user 130 may be imaged by camera 122 and analyzed by image processing program 128 to determine other information, such as an ambient light level or a location of an illumination source. In an embodiment, a portion of the head of user 130 is designated as ocular area 131 (dashed box). Ocular area 131 is a primary area of the head of user 130 that is imaged and analyzed, for example by image processing program 128 to determine the presence and type of eyewear worn by user 130.

Figure 2:
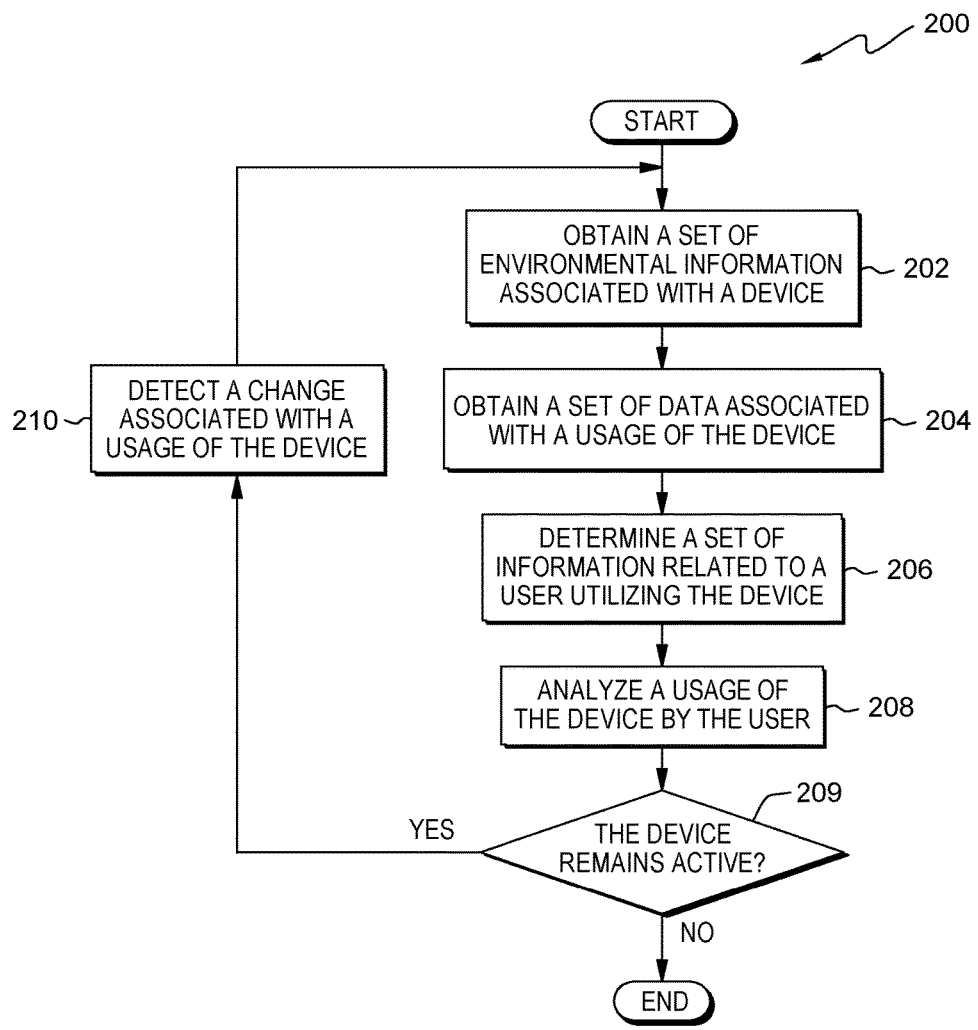
FIG. 2 depicts a flowchart of the operational blocks of a presentation learning program, in accordance with an embodiment of the present invention.

FIG. 2 is a flowchart depicting operational flow for presentation learning program 200, a program that monitors and stores information associated with a user and a client device (e.g., user 130 and client device 120 respectively) during a presentation of content by the client device, in accordance with embodiments of the present invention. Presentation learning program 200 may utilize one or more cameras of a client device or associated with the client device to determine the presence of eyewear if worn and information related to the eyewear worn by a user during a presentation of content. In addition, presentation learning program 200 monitors and/or determines various environmental factors present during a presentation of content to the user by a client device, and a set of characteristics associated with presentation of content by the client device, such as presentation software setting and characteristics of the presented content. As information is obtained and/or determined, presentation learning program 200 may store the information in user information 125.

In step 202, presentation learning program 200 obtains a set of environmental information associated with a device. Presentation learning program 200 may utilize one or more rates of sampling within user information 125 in response to obtaining sets of environmental information. In one embodiment, presentation learning program 200 obtains a set of environmental information or environmental factors associated with (e.g., in proximity to) client device 120. In one scenario, presentation learning program 200 utilizes images from one or more instance of camera 122 to determine an ambient light level, a source of glare and/or a location/direction associated with a source of light. In addition, presentation learning program 200 can utilize image processing software 128 to determine one or more environmental factors of images from camera 122. In another scenario, presentation learning program 200 utilizes one or more instances of sensors 121 to determine environmental factors such as, a level of illumination (e.g., ambient, background), a temperature, a barometric pressure, a humidity, in proximity to client device 120 during a presentation of content to user 130.

In some embodiments, presentation learning program 200 obtains other environmental information associated with a device, such as movement, direction, and/or whether client device 120 is within an enclosed space or outside. In one example, presentation learning program 200 may determine that for one point in time, during a presentation of content, the ambient light level is one value based on direction and movement associated with client device 120. At another point in time, with respect to the subsequent portion of the presentation of content, presentation learning program 200 may determine that the ambient light level is another value based on another direction and movement associated with client device 120. In another example, presentation learning program 200 may determine that user 130 is moving based on information from one or more accelerometers (e.g., sensors 121) of client device 130. Utilizing one or more aspects of analytics suite 127, presentation learning program 200 may determine whether user 130 is walking or whether user 130 is moving via a vehicle.

Still referring to step 202 in various embodiments, presentation learning program 200 obtains additional environmental information associated with client device 120 and/or within proximity of user 130 based, at least in part, on wireless and/or GPS locating of client device 120. In an example, presentation learning program 200 utilizes network 110 to access the Internet to obtain additional environmental information that may affect client device 120 and/or user 130, such as current weather conditions and/or a pollen count.

In step 204, presentation learning program 200 obtains a set of data associated with a usage of the device. In one embodiment, presentation learning program 200 obtains a set of data associated with a usage of client device 120 with respect to the presentation of content by client device 120. Presentation learning program 200 determines a set of data associated with a usage of client device 120 may include but is not limited to: content characteristics, such as content type (e.g., text-based, graphics-based, video, or a combination thereof); background colors; background images; presentation window sizes; aspect ratios, a level of zoom, a resolution of the content, and refresh/frame rates. In one example, presentation learning program 200 utilizes an instance of sensors 121 to determine a distance between the face of user 130 and client device 120, in addition to obtaining the characteristics (e.g., settings or display parameters) for a corresponding presentation of content to user 130.

With respect to text-based content, presentation learning program 200 may determine: font information, such as font type, font name, font style, a kerning value, and a font size; colors for the background and one or more displayed fonts; a level of zoom; and a level of brightness for display 123. In another embodiment, presentation learning program 200 determines that a user views a presentation of content on a display different from the display included in the client device. In one example, presentation learning program 200 determines that user 130 mirrors the display 123 to another display (not shown), such as a dashboard or a console of a vehicle to enable "hands-free" access to content presented by client device 120. In another example, presentation learning program 200 determines that a user utilizes a pair of smart glasses (not shown) to view a presentation of content from client device 120.

In some embodiments, presentation learning program 200 obtains two sets of data associated with the usage of client device 120. In an example, a first set of data may be based on user 130 starting (e.g., initiating) an application and selecting content to present on display 123 of client device 120. A second set of data may represent the state of display 123 in response to user 130 making one or more modifications to the presentation of content, such as a level of zoom, a level of brightness, an adjustment of font, a level of contrast, and/or an adjustment of color (e.g., RGB color space modification; a gamma correction; a color temperature adjustment, such as 5000K, 6500K, and 7500K; and/or a standard illuminant level adjustment).

Still referring to step 204 in a further embodiment, presentation learning program 200 obtains two or more sets of data that correspond to at least a first and a second presentation of content displayed by client device 130. In one scenario, presentation learning program 200 determines that two presentations of content occur concurrently, within separate windows or via a split-screen mode, utilizing display 123, and presentation learning program 200 obtains a set of data associated with each window. In an example, presentation learning program 200 may determine that a user displays a video within one window visible within display 123 and a streaming stock quotes and financial new items within another window. In another scenario, presentation learning program 200 determines that two presentations of content occur concurrently; however, user 130 switches between presentations of content. Only one presentation of content is visible within the foreground of display 123. Presentation learning program 200 obtains a set of data associated with each presentation of content.

In step 206, presentation learning program 200 determines a set of information related to a user utilizing the device. In one embodiment, presentation learning program 200 utilizes at least camera 122 and image processing program 128 to determine a set of information related to a user utilizing the device. In an example, presentation learning program 200 utilizes camera 122 and image processing program 128 to analyze one or more images of ocular area 131 of user 130 to determine whether user 130 is wearing eyewear (e.g., eyewear is present) and information related to the eyewear of user 130 if eyewear is present, such as eyeglasses with corrective lenses, sunglasses, or eyeglasses with clip-on sunglasses. In another embodiment, if client device 120 does not include image processing program 128, then presentation learning program 200 can utilize network 110 to access image processing program 108 of computing system 102 and analyze one or more images obtained by camera 122 of ocular area 131 of user 130 to determine whether eyewear is present and information related to the eyewear of user 130.

In some embodiments, presentation learning program 200 utilizes additional information from one or more instances of sensors 121 and/or one or more programs of analytics suite 127 to determine additional information related to eyewear of user 130. In one example, presentation learning program 200 may determine that the eyewear of user 130 is tinted, the tint is amber (e.g., attenuates the blue portion of the light spectrum), and the tint attenuates light by 5% for most colors but attenuates blues by up to 50%. In another example, presentation learning program 200 utilizes additional information from image processing program 128 and one or more programs of analytics suite 127 to determine whether the user is wearing contact lenses. Alternatively, presentation learning program 200 may access database 104 of computing system 102 to obtain examples of tinted eyewear and associated information that image processing program 128 compares to an image of ocular area 131 to determine additional information related to eyewear of user 130. In other embodiments, presentation learning program 200 pauses a presentation of content or generates a pop-up window associated with UI 124 to query user 130 for information associated with eyewear detected in ocular area 131 that is not included in user information 125.

Still referring to step 206 in a further embodiment, presentation learning program 200 determines additional information related to the face (not shown) and ocular area 131 of user 130. In an example, presentation learning program 200 utilizes at least camera 122 and image processing program 128 to analyze ocular area 131 to determine: a pupil size of user 130 and/or whether the eyes of user 130 are tearing, dry, redness (e.g., allergy-based, eyestrain-based). In another example, presentation learning program 200 utilizes at least camera 122 and image processing program 128 to analyze the face and ocular area 131 of user 130 to determine another facial response of user 130 to the presentation of content such as squinting.

In step 208, presentation learning program 200 analyzes a usage of the device by the user. In one embodiment, presentation learning program 200 analyzes a usage of the client device 120 by the user 130 to view a presentation of content. Presentation learning program 200 utilizes one or more aspects of analytics suite 127 to analyze a current set of: environmental information, data associated with a presentation of content, and information related to user 130 to determine relationships and interactions among environmental factors affecting client device 120, characteristic for a presentation of content by client device 120, and the presence of eyewear worn by user 130 or lack thereof. In some embodiments, presentation learning program 200 utilizes an analytics suite (e.g., analytics suite 127 and/or analytics suite 107) to analyze sets of: environmental information, data associated with presentations of content, and information related to user 130 stored within user information 125 or user information 105 to determine relationships and interactions among environmental factors affecting client device 120, a set of characteristics for a presentation of content by client device 120, and eyewear worn by user 130 or lack thereof. Thus, presentation learning program 200 can improve the correlations of the relationships and interactions among environmental factors, presentation of content, and eyewear of a user; and the generates tables, associative arrays, decision trees and/or algorithms utilized to modify presentations of content.

In various embodiments, presentation learning program 200 also utilizes one or more aspects of analytics suite 127 to generate one or more tables, associative arrays, decision trees and/or algorithms to modify presentations of content based on relationships and interactions among environmental factors affecting client device 120, characteristics for a presentation of content by client device 120, and eyewear worn by user 130 or lack thereof. Alternatively, presentation learning program 200 may utilize one or more aspects of analytics suite 107 of computing system 102 to generate one or more tables, associative arrays, decision trees and/or algorithms to modify presentations of content based on relationships and interactions among environmental factors affecting client device 120, characteristics for a presentation of content by client device 120, and eyewear worn by user 130 or lack thereof. Presentation learning program 200 stores the generated one or more tables, associative arrays, decision trees and/or algorithms that modify presentations of content within user information 125. In another embodiment, presentation learning program 200 uploads some or all of the information within user information 125 to user information 105 of computing system 102.

In decision step 209, presentation learning program 200 determines whether the device remains active. In some embodiments, presentation learning program 200 determines that client device 120 remains active based on at least one app that presents content the user continues to execute or at least is paused. In one embodiment, presentation learning program 200 that client device 120 does not remain active based on a user changing the operational mode of client device 120, such as turning off, deactivating, and/or initiating "sleep mode" of client device 120. In another embodiment, presentation learning program 200 determines that client device 120 does not remain active based on an app and/or program that presents content to user 130 ceases to execute. Alternatively, presentation learning program 200 may determine that client device 120 does not remain active based on the completion of a presentation of content to user 130 by an app and/or program.

In other embodiments, presentation learning program 200 determines that client device 120 does not remain active based determining that client device 120 is stored. In one example, presentation learning program 200 determines that client device 120 is stored (e.g., is not active) based lack of images from camera 122 and/or an instance of sensors 121 sensing a lack of illumination or illumination below a threshold level, such as when client device 120 is in a pocket, briefcase, or backpack of user 130. In another example, presentation learning program 200 determines that client device 120 (e.g., a laptop computer) is stored based on an instance of sensors 121 detecting that a hinge associated with the display of client device 120 is in a closed position.

Still referring to decision step 209 in a further embodiment, presentation learning program 200 determines whether client device 120 remains active based on an image processing program, such as image processing program 128 determining whether user 130 is within the field of view of camera 122. If an image processing program detects user 130 within the field of view of camera 122, then presentation learning program 200 determines that client device 120 remains active. Else, presentation learning program 200 determines that client device 120 does not remains active. In some scenarios, presentation learning program 200 may utilize a trigger value/user preference within user information 125 to determine a duration corresponding a period of time that user 130 can remain out of the field of view of camera 122 prior to presentation learning program 200 determining that client device 120 does not remains active.

In response to determining that the device remains active (Yes branch, decision step 209), presentation learning program 200 detects a change associated with a usage of the device (step 210).

In step 210, presentation learning program 200 detects a change associated with a usage of the device. In one embodiment, presentation learning program 200 detects a change associated with ocular area 131, such as image processing program 128 determining that user 130 removes a pair of glasses or information related to the eyewear changes. In another embodiment, presentation learning program 200 detects a change associated with one or more setting and/or parameters of an executing app that presents content to user 130. In some embodiments, presentation learning program 200 detects a change associated with a usage the client device 120, such as a user 130 initiating another app that presents content to the user. In various embodiments, presentation learning program 200 detects a change associated with a usage of client device 120 based on a change to one or more environmental factors based on input from one or more instances of sensors 121 and/or camera 122. In a further embodiment, presentation learning program 200 detects a change associated with a usage of client device 120 based on an analysis of the face of user 130, such as a change in a facial characteristic and/or a change in orientation of the face of the user with respect to display 123.

Subsequently, presentation learning program 200 loops to step 202 to obtain another set of environmental information associated with the device.

Referring to decision step 209, responsive to determining that the device does not remain active (No branch, decision step 209), presentation learning program 200 terminates.

Figure 3:
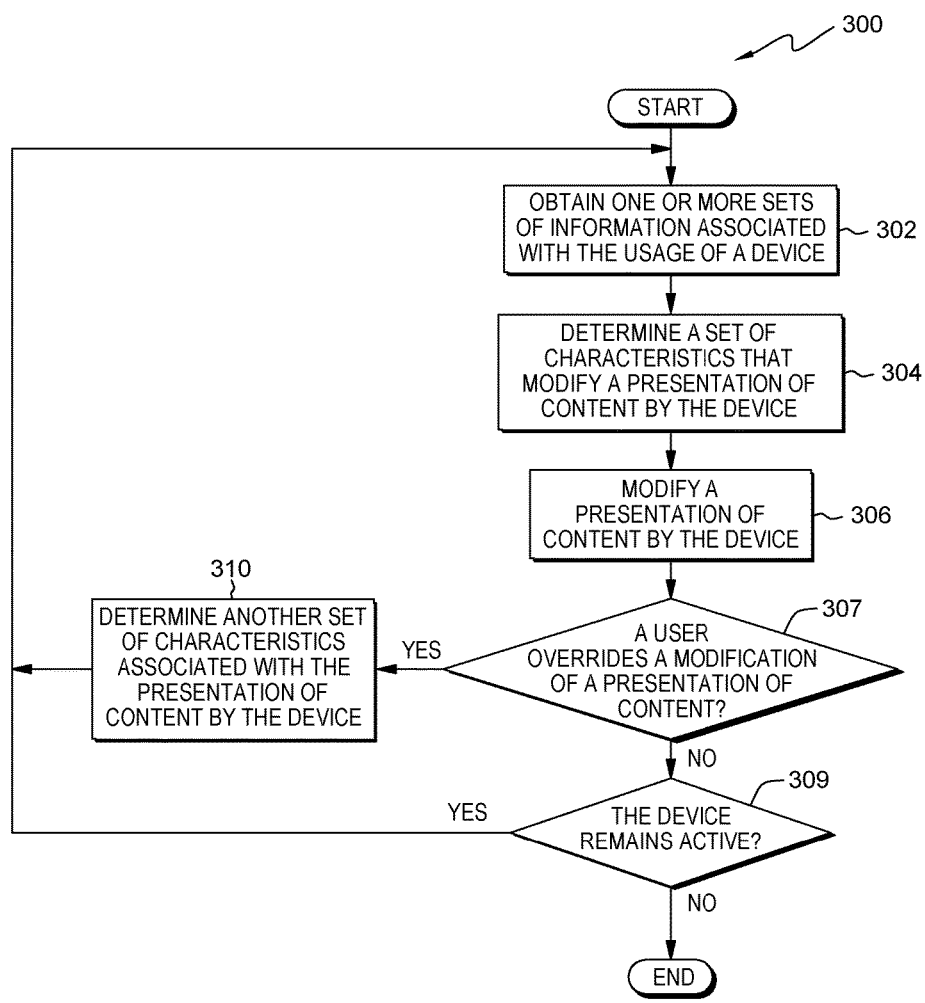
FIG. 3 depicts a flowchart of the operational blocks of a presentation modification program, in accordance with an embodiment of the present invention.

FIG. 3 is a flowchart depicting operational flow for presentation modification program 300, a program for modifying the presentation of content by a client device, in accordance with embodiments of the present invention. In one embodiment, presentation modification program 300 executes in response to detecting an execution of an app or program that presents visual content to a user of the client device. In another embodiment, presentation modification program 300 activates (e.g., executes in the background) in response to the initialization of client device 120 and presentation modification program 300 monitors client device 120 for one or more apps to that present content to a user. In response to detecting the activation of an app that presents content to the user presentation modification program 300 executes. In various embodiments, presentation modification program 300 modifies a presentation of content by utilizing one or more generated tables, associative arrays, decision trees, and/or algorithms and information associated with the content of the presentation, one or more environmental factors, and characteristics of a user, such as eyewear or lack thereof.

In step 302, presentation modification program 300 obtains one or more sets of information associated with the usage of a device. Presentation modification program 300 obtains one or more sets of information associated with client device 120, such as an app presenting content to user 130; information associated with the content presented; a set of environmental information; information and characteristics related to user 130, such as whether eyewear is detected in ocular area 131 and if so information related to the detected eyewear. In various embodiments, presentation modification program 300 can utilize information obtained by presentation learning program 200 (described in further detail with reference to steps 202, 204, and 206, of FIG. 2.

In step 304, presentation modification program 300 determines a set of characteristics that modify a presentation of content by the device. In one example, in response to determining that user 130 is wearing a pair of tinted glasses, presentation modification program 300 determines to adjust the color (e.g., one or more characteristics) of a presentation of content (e.g., pictures, videos, etc.) by adjusting the color temperature or sRGB color space displayed by the client device 120 based on the tint of the glasses of the user. In another example, based on a size of a presentation window, a viewing distance, and text-based content presentation, modification program 300 may utilize typography software (not shown) to modify the stroke width (e.g., weight) of one or more fonts and/or font kerning prior to presenting the text-based content via display 123. In another example, presentation modification program 300 determines that client device 120 is at an angle with respect to user 130. In addition to other characteristics, presentation modification program 300 may determine a degree of keystoning to apply to a presentation of content to correct for the angle of client device 120.

In one embodiment, presentation modification program 300 determines a set of characteristics (e.g., settings) that modify a presentation of content by client device 120 based on the one or more obtained sets of data obtained (step 302) and one or more tables, associative arrays, decision trees, and/or algorithms for modifying a presentation of content within user information 125. In another embodiment, if client device 120 does not include an instance of presentation modification program 300, then client device 120 utilizes an instance of presentation modification program 300 that executes on another computing system, such as computing system 102 to determine a set of characteristics (e.g., settings) that modify a presentation of content by client device 120 based on the one or more obtained sets of data obtained and one or more tables, associative arrays, decision trees, and/or algorithms for modifying a presentation of content within user information 125 and/or user information 105. In an example, a pair of smart glasses utilizes an instance of presentation modification program 300 that executes on a smartphone to determine a set of characteristic that modify a presentation of content by an instance of display 123 of the pair of smart glasses.

In some embodiments, presentation modification program 300 determines a set of characteristics that modify a presentation of content based on a "snapshot" or short duration sampling of characteristics of user 130 and various environmental factors prior to or at the beginning of a presentation of content. In other embodiments, presentation modification program 300 utilizes decision step 309 to loop and dynamically determine sets of characteristics to modify a presentation of content based on a continued sampling of characteristics of user 130 and environmental factors in proximity to client device 120 during a presentation of content.

Still referring to step 304 in a further embodiment, if presentation modification program 300 cannot determine a set of characteristics that modify a presentation of content by client device 120, then presentation modification program 300 accesses computing system 102. Presentation modification program 300 utilizes aggregated data 106 and analytics suite 107 to determine a set of characteristics that modify a presentation of content by client device 120. In one example, presentation modification program 300 access database 104 and aggregated data 106 to identify a set of characteristics (e.g., settings) for a similar presentation of content of other user that have mobile devices similar to client device 120 and characteristics (e.g., eyewear) similar to user 120. In another example, presentation modification program 300 accesses database 104, aggregated data 106, and analytics suite 107 to generate a new algorithm that modify a presentation of content. Presentation modification program 300 utilizes the new algorithm and the one or more sets of information obtained in step 302 to determine a set of characteristics that modify a presentation and presentation modification program 300 downloads the determined set of characteristics that modify a presentation of content to client device 120.

In step 306, presentation modification program 300 modifies a presentation of content by the device. In one embodiment, presentation modification program 300 modifies a presentation of content be device 120 based on a determined set of characteristics that modify a presentation of content derived from tables, associative arrays, decision trees, and/or algorithms within user information 125. In another embodiment, presentation modification program 300 modifies a presentation of content be device 120 based on a determined set of characteristics that modify a presentation of content derived from tables, associative arrays, decision trees, and/or algorithms within user information 105. In some embodiments, presentation modification program 300 modifies a presentation of content be device 120 based on a determined set of characteristics that modify a presentation of content derived from information within aggregated data 106.

In decision step 307, presentation modification program 300 determines whether a user overrides a modification of a presentation of content. In one embodiment, presentation modification program 300 determines that user 130 overrides a modification of a presentation of content based on one or more changes to the set of characteristics that modify a presentation of content. In another embodiment, presentation modification program 300 determines that user 130 overrides a modification of a presentation of content based on one or more changes to characteristics of user 130, such as a change in facial expression (e.g., a frown) or a change to ocular area 131. In some embodiments, presentation modification program 300 determines that user 130 overrides a modification of a presentation of content based on input from a user via UI 124. Responsive to determining that a user does not override a modification of a presentation of content (No branch, decision step 307), presentation modification program 300 determines whether the device remains active (decision step 309).

In decision step 309, presentation modification program 300 determines whether the device remains active. The embodiments, conditions, and user information utilized by presentation modification program 300 to determine whether client device 120 remains active are substantially similar to the embodiments, conditions, and user information discussed with respect to FIG. 2, decision step 207, of presentation learning program 200.

In response to determining that the device remains active (Yes branch, decision step 309), presentation modification program 300 loops to obtain another set of information associated with a usage of the device (step 302). In one embodiment, presentation modification program 300 loops continuously. In another embodiment, presentation modification program 300 delays looping or pauses based on one or more user preferences within user information 125, such as a rate of sampling, duration of sampling, snapshot as opposed to continuous monitoring, and/or one or more triggers or events. In some embodiments, if two or more instance of presentation modification program 300 execute concurrently, then each instance of presentation modification program 300 can loop based on different user preferences. In an alternative embodiment, if modifications to a presentation of content of client device 120 are controlled by an instance of presentation modification program 300 executing within computing system 102, then presentation modification program 300 may utilize information within user information 105 of computing system 102.

In response to determining that the device does not remain active (No branch, decision step 309), presentation modification program 300 terminates.

Referring to decision step 307, responsive to determining that a user overrides a modification of a presentation of content (Yes branch, decision step 307), presentation modification program 300 determines another set of characteristics associated with the presentation of content by the device (step 310).

In step 310, presentation modification program 300 determines another set of characteristics associated with the presentation of content by the device. In one embodiment, presentation modification program 300 determines another set of characteristics associated with the presentation of content by client device 120 based on one or more changes to the presentation of content by user 130. In another embodiment, presentation modification program 300 determines another set of characteristics associated with the presentation of content by client device 120 based on input from user 130. In an example, in response to an override of a modification to a presentation of content, presentation modification program 300 utilizes user information 125 and analytics suite 127 to generate and array of depictions of presentation modifications, such as illumination and contrast variants in one axis and color temperature and sRGB color space variants in the other axis. In some embodiments, presentation modification program 300 determines another set of characteristics associated with the presentation of content by client device 120 based on presenting examples of presentation modifications utilizing sets of characteristics stored within aggregated data 106 and receiving input from user 130.

In response to determining another set of characteristics associated with the presentation of content by client device 120, presentation modification program 300 stores the other set of characteristics associated with the presentation of content within user information 125. In addition, presentation modification program 300 loops to obtain another set of information associated with a usage of the device (step 302).

Figure 4:
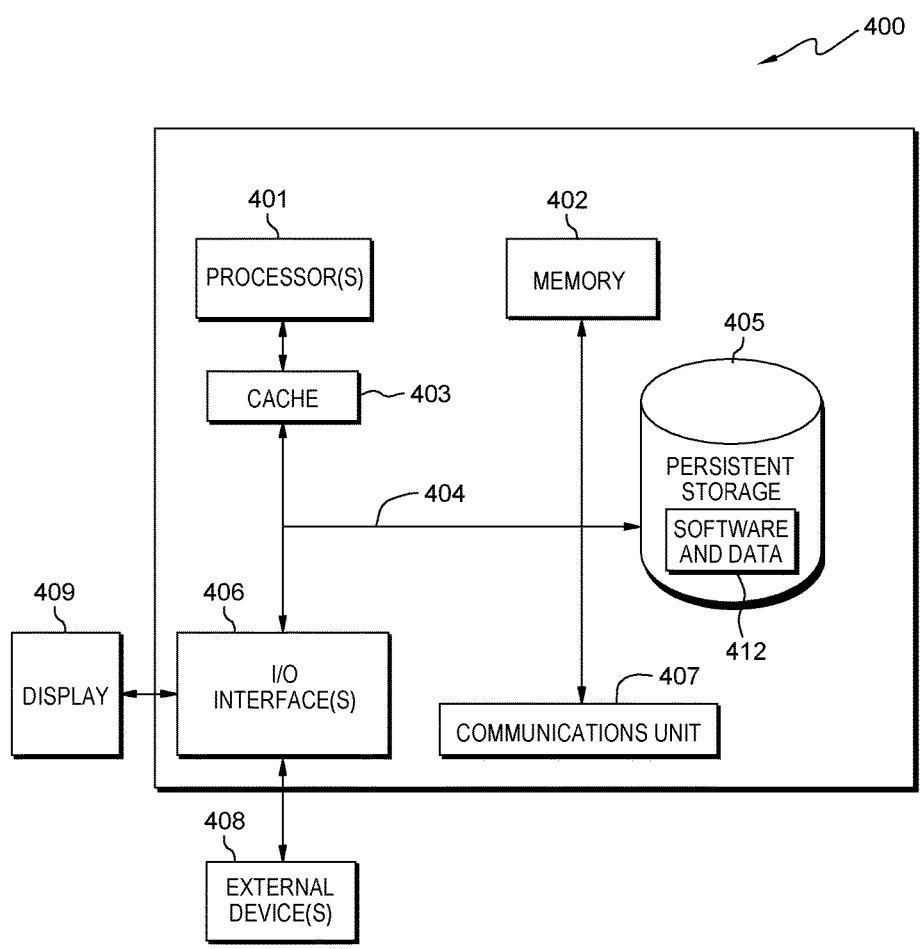
FIG. 4 is a block diagram of components of a computer, in accordance with an embodiment of the present invention.

FIG. 4 depicts computer system 400, which is representative of computing system 102 and client device 120. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. With respect to computing system 102, storage 103 is included within a portion of persistent storage 405.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing system 102, software and data 412 includes database 104, user information 105, aggregated data 106, analytics suite 107, image processing program 108, an instance of presentation modification program 300, and various programs (not shown). Still with respect to computing system 102, software and data 412 may also include an instance of presentation learning program 200. With respect to client devices 120 software and data 412 includes UI 124, analytics suite 127, image processing program 128, presentation learning program 200, presentation modification program 300, and various programs and data (not show).

Communications unit 407, in these examples, provides for communications with other data processing systems or devices, including resources of computing system 102 and client device 120. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. I/O interface(s) 406 allows for input of data from sensors 121 and camera 122. For example, I/O interface(s) 406 may provide a connection to external device(s) 408, such as a keyboard, a keypad, a touch screen, microphone, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer, smartphone, or a display console.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or step diagrams of methods, apparatus (systems), and computer program products according to embodiments of the invention. It will be understood that each step of the flowchart illustrations and/or block diagrams, and combinations of steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram step or steps.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram step or steps.

The flowchart and block diagrams in the Figures illustrate the architecture, functionality, and operation of possible implementations of systems, methods, and computer program products according to various embodiments of the present invention. In this regard, each step in the flowchart or block diagrams may represent a module, segment, or portion of instructions, which comprises one or more executable instructions for implementing the specified logical function(s). In some alternative implementations, the functions noted in the steps may occur out of the order noted in the Figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

What is claimed is:

1. A method for modifying a presentation of content, the method comprising:
   determining, by one or more computer processors, whether a user of a computing device wears eyewear based, at least in part, on analyzing an image of a face of the user;
   in response to determining that the user wears eyewear, determining, by one or more computer processors, a set of characteristics of the eyewear of the user;
   determining, by one or more computer processors, a set of environmental factors in proximity of the user and the computing device, wherein determining the set of environmental factors in proximity of the user and the computing device further comprises:
      determining, by one or more computer processors, one or more environmental factors based on an analysis of information from one or more sensors included in the computing device;
      determining, by one or more computer processors, location information of the computing device related to an environment in which the computing device operates;
      obtaining, by one or more computer processors, other environmental factors related to the location information of the computing device;
   analyzing, by one or more computer processors, changes associated with the set of environmental factors that affect the presentation of visual content; and
   modifying, by one or more computer processors, a presentation of visual content on the computing device based, on the set of characteristics of the eyewear of the user, the determined set of environmental factors in proximity of the user and the computing device, and the analyzed changes associated with the set of environmental factors that affect the presentation of visual content.

2. The method of claim 1, wherein modifying the presentation of the visual content based, at least in part, on the set of characteristics of the eyewear of the user, the determined set of environmental factors in proximity of the user and the computing device, and the analyzed changes associated with the set of environmental factors that affect the presentation of visual content further comprises:

determining, by one or more computer processors, a set of characteristics that modify the presentation of content based, at least in part on a plurality of information, wherein the plurality of information is selected from the group consisting of historical data associated the user, information associated with the computing device, information associated with the visual content, characteristics utilized during one or more previous presentations of the visual content, the determined set of characteristics of the eyewear of the user, and the determined set of environmental factors in proximity of the user and the computing device.

3. The method of claim 1, wherein the one or more environmental factors are selected from the group consisting of temperature, humidity, pollen count, barometric pressure, a level of ambient illumination, and a weather condition.

4. The method of claim 1, wherein the set of characteristics of the eyewear of the user is selected from the group consisting of a tint of the eyewear, a level of transmittance of the eyewear, lens of the eyewear include a corrective prescription, the eyewear of the user consists of contact lenses, and a photochromic coating of the eyewear.

5. The method of claim 2, wherein determining the set of characteristics that modify the presentation of content is further based on a rate of sampling associated with one or more aspects of the plurality of information, wherein the rate of sampling is selected from the group consisting of a snapshot of time, a short duration of time, and continuous sampling.

6. A computer program product for modifying a presentation of content, the computer program product comprising:

one or more computer readable storage media and program instructions stored on the one or more computer readable storage media, the program instructions readable/executable by one or more computer processors:

program instructions to determine whether a user of a computing device wears eyewear based, at least in part, on analyzing an image of a face of the user;

program instructions to respond to determining that the user wears eyewear, by determining a set of characteristics of the eyewear of the user;

program instructions to determine a set of environmental factors in proximity of the user and the computing device, wherein program instructions to determine the set of environmental factors in proximity of the user and the computing device further comprise:

program instructions to determine one or more environmental factors based on an analysis of information from one or more sensors included in the computing device:

program instructions to determine location information of the computing device related to an environment in which the computing device operates;

program instructions to obtain other environmental factors related to the location information of the computing device;

program instructions to analyze changes associated with the set of environmental factors that affect the presentation of visual content; and program instructions to modify a presentation of visual content on the computing device based, on the set of characteristics of the eyewear of the user, the determined set of environmental factors in proximity of the user and the computing device, and the analyzed changes associated with the set of environmental factors that affect the presentation of visual content.

7. The computer program product of claim 6, wherein program instructions to modify the presentation of the visual content based, at least in part, on the set of characteristics of the eyewear of the user, the determined set of environmental factors in proximity of the user and the computing device, and the analyzed changes associated with the set of environmental factors that affect the presentation of visual content further comprise:

program instructions to determine a set of characteristics that modify the presentation of content based, at least in part on a plurality of information, wherein the plurality of information is selected from the group consisting of historical data associated the user, information associated with the computing device, information associated with the visual content, characteristics utilized during one or more previous presentations of the visual content, the determined set of characteristics of the eyewear of the user, and the determined set of environmental factors in proximity of the user and the computing device.

8. The computer program product of claim 6, wherein the one or more environmental factors are selected from the group consisting of temperature, humidity, pollen count, barometric pressure, a level of ambient illumination, and a weather condition.

9. The computer program product of claim 6, wherein the set of characteristics of the eyewear of the user is selected from the group consisting of a tint of the eyewear, a level of transmittance of the eyewear, lens of the eyewear include a corrective prescription, the eyewear of the user consists of contact lenses, and a photochromic coating of the eyewear.

10. The computer program product of claim 7, wherein program instruction to determine the set of characteristics that modify the presentation of content is further based on a rate of sampling associated with one or more aspects of the plurality of information, wherein the rate of sampling is selected from the group consisting of a snapshot of time, a short duration of time, and continuous sampling.

11. A computer system for modifying a presentation of content, the computer system comprising:

one or more computer processors;

one or more computer readable storage media;

program instructions stored on the computer readable storage media for reading/execution by at least one of the one or more computer processors, the program instructions further comprising:

program instructions to determine whether a user of a computing device wears eyewear based, at least in part, on analyzing an image of a face of the user;

program instructions to respond to determining that the user wears eyewear, by determining a set of characteristics of the eyewear of the user, wherein program instructions to determine the set of environmental factors in proximity of the user and the computing device further comprise:

program instructions to determine one or more environmental factors based on an analysis of information from one or more sensors included in the computing device;

program instructions to determine location information of the computing device related to an environment in which the computing device operates;

program instructions to obtain other environmental factors related to the location information of the computing device;

program instructions to analyze changes associated with the set of environmental factors that affect the presentation of visual content; and program instructions to modify a presentation of visual content on the computing device based, on the set of characteristics of the eyewear of the user, the determined set of environmental factors in proximity of the user and the computing device, and the analyzed changes associated with the set of environmental factors that affect the presentation of visual content.

12. The computer system of claim 11, wherein program instructions to modify the presentation of the visual content based, at least in part, on the set of characteristics of the eyewear of the user, the determined set of environmental factors in proximity of the user and the computing device, and the analyzed changes associated with the set of environmental factors that affect the presentation of visual content further comprise:

program instructions to determine a set of characteristics that modify the presentation of content based, at least in part on a plurality of information, wherein the plurality of information is selected from the group consisting of historical data associated the user, information associated with the computing device, information associated with the visual content, characteristics utilized during one or more previous presentations of the visual content, the determined set of characteristics of the eyewear of the user, and the determined set of environmental factors in proximity of the user and the computing device.

13. The computer system of claim 11, wherein the one or more environmental factors are selected from the group consisting of temperature, humidity, pollen count, barometric pressure, a level of ambient illumination, and a weather condition.

14. The computer system of claim 11, wherein the set of characteristics of the eyewear of the user is selected from the group consisting of a tint of the eyewear, a level of transmittance of the eyewear, lens of the eyewear include a corrective prescription, the eyewear of the user consists of contact lenses, and a photochromic coating of the eyewear.

15. The method of claim 1, wherein determining the location information of the computing device is further based on visual information obtained by the camera of the computing device, wherein the location information of the computing device includes: a distance from a display of the computing device to the face of the user, an angle of the display of the computing device with respect to the face of the user, and an orientation of the display of the computing device with respect to the face of the user.

16. The method of claim 1, wherein the other environmental factors related to the location information of the computing device include: a source of glare, background colors that occur in proximity to the user, and a movement of the computing device and the user.

17. The computer program product of claim 6, wherein program instructions to determining the location information of the computing device is further based on program instructions to obtain visual information by the camera of the computing device, wherein the location information of the computing device includes: a distance from a display of the computing device to the face of the user, an angle of the display of the computing device with respect to the face of the user, and an orientation of the display of the computing device with respect to the face of the user.

18. The computer program product of claim 6, wherein the other environmental factors related to the location information of the computing device include: a source of glare, background colors that occur in proximity to the user, and a movement of the computing device and the user.

19. The computer system of claim 11, wherein program instructions to determining the location information of the computing device is further based on program instructions to obtain visual information by the camera of the computing device, wherein the location information of the computing device includes: a distance from a display of the computing device to the face of the user, an angle of the display of the computing device with respect to the face of the user, and an orientation of the display of the computing device with respect to the face of the user.

20. The computer system of claim 11, wherein the other environmental factors related to the location information of the computing device include: a source of glare, background colors that occur in proximity to the user, and a movement of the computing device and the user.

* * * * *